United States Patent [19]

Seale et al.

[11] 3,789,074

[45] Jan. 29, 1974

[54] PARTICLE SIZE-PH EFFECTS ON REDUCED COPPER OXIDE IN PREPARATION OF ACRYLAMIDE

[75] Inventors: Virgil L. Seale, Brookhaven, Miss.; Jerry J. Svarz, LaGrange, Ill.; Louis A. Goretta, Naperville, Ill.; John D. Newkirk, Downers Grove, Ill.; Wood E. Hunter, Lombard, Ill.; Frederick J. Sibert, Chicago, Ill.

[73] Assignee: Nalco Chemical Company, Chicago, Ill.

[22] Filed: June 23, 1972

[21] Appl. No.: 265,902

[52] U.S. Cl............. 260/561 N, 252/476, 260/404, 260/558 R, 260/561 R
[51] Int. Cl.......................................... C07c 103/08
[58] Field of Search...... 260/561 N, 561 R; 252/476

[56] References Cited

UNITED STATES PATENTS

| 2,643,199 | 6/1953 | Hersch.................................. 252/476 |
| 3,642,894 | 2/1972 | Habermann et al............ 252/476 X |
| 3,597,481 | 8/1971 | Tefertiller et al................ 252/476 X |
| 3,642,643 | 2/1972 | Habermann................ 260/561 N X |

Primary Examiner—Lewis Gotts
Assistant Examiner—Ethel G. Love
Attorney, Agent, or Firm—John G. Premo; James F. Lambe

[57] ABSTRACT

A process for catalytically hydrolyzing a nitrile to the corresponding amide by contacting a nitrile with an improved reduced copper oxide catalyst.

2 Claims, No Drawings 3,789,074

PARTICLE SIZE-PH EFFECTS ON REDUCED COPPER OXIDE IN PREPARATION OF ACRYLAMIDE

INTRODUCTION

This invention relates to a process for catalytically hydrolyzing a nitrile to form the corresponding amide. The hydrolysis of nitriles to form the corresponding amides and other hydrolysis products in the presence of acids and bases is well known to those skilled in the art as noted in U.S. Pat. 3,381,034. The prior art teaches the use of copper-copper ion catalyst, reduced copper oxide catalyst, reduced copper-chromium or copper-molybdenum oxide catalyst and other catalysts composed of heavy metals such as zinc, cadmium, chromium and silver. These catalysts as well as others are disclosed in U.S. Pat. Nos. 3,381,034 and 3,631,104.

More specifically, U.S. Pat. No. 3,631,104 teaches a process for converting a nitrile to the corresponding amide by reacting an aliphatic nitrile in the presence of water with a heterogeneous, cuprous catalyst consisting essentially of copper prepared by reducing copper oxide. The present invention involves the use of an improved reduced copper oxide catalyst which results in an improved conversion of nitrile to amide. The discovery of this improved method of reducing the copper oxides has resulted in a substantial increase in the conversion of nitrile to amide.

OBJECTS

It is an object of this invention to provide an improved catalyst for hydrolyzing a nitrile to the corresponding amide.

It is also an object of this invention to provide a process for hydrolyzing a nitrile to the corresponding amide, the improvement which comprises the reaction of the nitrile in the presence of an improved catalyst composition.

A further object of this invention is to provide a process for hydrolyzing acrylonitrile to acrylamide.

A still further object of this invention is to provide a process for hydrolyzing acrylonitrile to acrylamide, the improvement comprising the reaction of acrylonitrile in the presence of an improved reduced copper oxide catalyst.

Further objects will appear hereinafter.

INVENTION

This invention provides a process for catalytically hydrolyzing a nitrile to the corresponding amide by contacting a reactant feed of nitrile in the presence of water with a reduced copper oxide catalyst, the improvement which comprises preparing said reduced copper oxide catalyst by the following steps:

A. Preparing a 5 to 20 percent by weight aqueous slurry of copper oxide, said slurry having a pH within a range 8 to 11; said copper oxide characterized as having a surface area within the range 20 to 500 $M^2/g$;

B. Reducing said slurry of copper oxide of step (A) in a hydrogen atmosphere to prepare a reduced copper oxide catalyst; then C. Treating the nitrile with said catalyst prepared in step (B) to form the amide.

The copper oxide catalyst used in this invention may be cupric oxide, cuprous oxide or a mixture thereof. Both oxides are readily available as commercial products and typically are prepared by the decomposition of copper carbonate, copper hydroxide, copper nitrate, copper sulfate, copper acetate or any other decomposable copper salt.

This invention involves the preparation of an aqueous slurry of copper oxide, the slurry containing from 5 to 20 percent by weight of copper oxide. It has been determined that the activity of the reduced copper oxide catalyst is dependent upon the pH of this slurry. It has been found that a pH in the range 8 to 11 results in a highly active reduced copper oxide catalyst while a pH outside of this range will result in a catalyst with lower activity. The preferred pH range is 9 to 10.5.

It has been determined that the surface area of the copper oxide is of critical importance in obtaining a highly active catalyst. It has been found that a surface area within the range 20 to 500 $M^2/g$ results in an improved reduced copper oxide catalyst, with the preferred surface area being from 20 to 100 $M^2/g$.

A typical procedure for the reduction of copper oxide would involve the dispersing in water from 5 to 20 percent by weight of copper oxide having a surface area within the range 20 to 500 $M^2/g$, with the preferred surface area being 20 to 100 $M^2/g$. The pH of the slurry is then adjusted to from 8 to 11 with an alkali metal hydroxide. Typical alkali metal hydroxides are those of sodium, potassium, calcium and magnesium. The preferred alkali metal hydroxides are sodium hydroxide and potassium hydroxide. Another useful agent to increase the pH is ammonia or ammonium hydroxide.

The slurry containing the copper oxide is then reduced to produce a finished catalyst. The methods of reduction are numerous and well known to the art. Typical methods involve the heating of oxide in an inert gas atmosphere in the presence of a reduction catalyst. Any of these known reduction methods would be applicable. A typical reduction method is disclosed in the German publication by C. Paal, Uber katalytische Wirkungen kolloidaler Metalle der Platingruppe. X. Die Reduktion von Schwermetalloxyden. The preferred reduction method of this invention involves the reduction of the aqueous slurry containing copper oxide in an inert atmosphere in the presence of a catalytic agent. The catalytic agent is selected from the group consisting of palladium, platinum, rhodium or rhenium coated upon a carrier. The preferred type of carrier is a powdered charcoal carrier. The palladium coated upon a powdered charcoal carrier type catalyst is preferred and is a commercially available product. These commercially available catalysts typically have from 5 to 20 percent by weight of palladium coated upon the powdered charcoal surface. The inert atmosphere used is preferably a hydrogen atmosphere. The reduction will proceed at ambient temperature in from 1 to 3 hours.

The nitriles used in the present invention may be any aliphatic or aromatic nitriles with those nitriles containing up to about 20 or more carbon atoms being preferred. For purposes of the invention, aromatic nitriles are defined as those nitriles having cyano groups attached to the aromatic nucleus. Representative examples of suitable nitriles include saturated aliphatic hydrocarbon nitriles such as acetonitrile, propionitrile, valeronitrile, dodecanonitrile, succinonitrile, adiponitrile, and the like; unsaturated aliphatic hydrocarbon nitriles such as acrylonitrile, methacrylonitrile, crotononitrile, β-phenylacrylonitrile, 2-cyano-2-butene, 1-cyano-1-octene, 10-undecenonitrile, maleonitrile, fumaronitrile, and the like; aromatic nitriles such as benzonitrile, p-toluonitrile, α-naphthonitrile, phthalonitrile and the like. Of the nitriles suitable for use in the invention, olefinic nitriles of 3 to 6 carbon atoms are especially preferred with the conversion of acrylonitrile to acrylamide being of special interest.

The hydrolysis of the nitrile to the corresponding amide in the invention may be conducted in an essentially aqueous media. Excess water is the preferred solvent although other inert solvents such as dioxane, dimethylsulfoxide, acetone, dimethyl ether of ethylene glycol or tetrahydrofuran, may be used. Any practical amount of water may be added. Molar excesses of water up to 50 moles of water to 1 mole of nitrile are suitable with excesses of less than 40:1 being preferred. In the practice of this invention, the nitriles may be added to the aqueous mix containing the reduced copper oxides.

The temperature at which the nitriles are converted to the amides is basically a function of the reactants used in the process of the invention. Since the reaction of the present invention is a liquid phase hydrolysis, the melting and boiling points of the reaction mixture are the limiting factors of the range of reaction temperatures. As a practical matter, the suitable range of temperatures is from 0° to 400°C. with 25° to 200°C. being preferred. For unsaturated nitriles which tend to polymerize, a reaction temperature of less than 200°C. is desirable.

The following examples illustrate the process of this invention:

EXAMPLE 1

To 100 grams of deionized water was added 25 grams of copper oxide which was obtained by the calcination of copper carbonate at 500°C. The surface area of the copper oxide was 35 $M^2/g$. To this mixture was added 0.5 grams of a catalytic agent composed of 10 percent palladium on powdered charcoal. This mixture was mildly agitated for four hours at 28°C. in a hydrogen atmosphere.

At the end of the reduction step 200 grams of acrylonitrile were added to the catalyst as prepared above. The mixture was heated at 108°C. for 6 hours. The solution was analyzed for acrylamide with the result being that the yield was 68 percent.

EXAMPLE 2

To 200 grams of deionized water were added 55 grams of copper oxide which was formed by the calcination of copper hydroxide at 500°C. The surface area of the copper oxide was 20 $M^2/g$. The pH of the slurry was adjusted to 9.5 with a dilute solution of sodium hydroxide. Also added was 0.5 grams of a catalytic agent composed of 10 percent palladium on powdered charcoal. The mixture was mildly agitated for 2 hours at 25°C. in a hydrogen atmosphere.

At the termination of the reduction step 400 grams of acrylonitrile was added to the catalyst mix as prepared above. The mixture was heated to 110°C. for four hours, at which time the resulting mixture was analyzed for acrylamide. The yield was 70 percent.

EXAMPLE 3

To 200 grams of water was added 50 grams of copper oxide formed from the calcination of copper carbonate. The surface area of the copper oxide was 70 $M^2/g$. To this was added 0.5 grams of a 10 percent palladium on powdered charcoal catalytic agent. The mixture was mildly agitated for 2½ hours at 28°C. in a hydrogen atmosphere.

After the reduction was completed 400 grams of methacrylonitrile were added to the catalyst mixture as prepared above. The mixture was heated at 112°C. for 4 hours at which time the conversion to methacrylamide was measured to be 65 percent.

EXAMPLE 4

To 400 grams of water were added 63 grams of copper oxide which was prepared by the calcination of copper carbonate at 500°C. and 0.5 grams of a catalytic agent composed of 10 percent palladium on powdered charcoal. The mxture was mildly agitated for 5 hours at 25°C. in a hydrogen atmosphere. The surface area of the copper oxide was 90 $M^2/g$.

At the end of the reduction step 400 grams of acrylonitirle were added to the catalyst as prepared above. The mixture was heated to 110°C. for 6 hours at which time the conversion to acrylamide was 65 percent.

EXAMPLE 5

To 200 grams of deionized water were added 55 grams of copper oxide formed by the calcination of copper hydroxide at 400°C. and 0.5 grams of a catalyst composed of 10 percent palladium on powdered charcoal. The surface area of the copper oxide was 150 $M^2/g$. The pH of the slurry was adjusted to 9.5 with a dilute soluton of sodium hydroxide. The mixture was mildly agitated for 2 hours at 25°C. in a hydrogen atmosphere.

At the termination of the reduction step 400 grams of acrylonitrile was added to the catalyst mix as prepared above. The mixture was heated to 110°C. for 4 hours, at which time the resulting mixture was analyzed for acrylamide. The yield was 60 percent.

EXAMPLE 6

To 100 grams of deionized water was added 25 grams of copper oxide which was obtained by the calcination of copper carbonate at 500°C. The surface area of the copper oxide was 140 $M^2/g$. To this mixture was added 0.5 grams of a catalytic agent composed of 10 percent palladium on powdered charcoal. This mixture was mildly agitated for 4 hours at 28°C. in a hydrogen atmosphere.

At the end of the reduction step 200 grams of acrylonitrile were added to the catalyst as prepared above. The mixture was heated at 108°C. for 6 hours. The solution was analyzed for acrylamide with the result being that the yield was 55 percent.

EXAMPLE 7

An additional series of experiments were performed exactly as in Example 1 with the exception that the pH was varied using different amounts of sodium hydroxide or hydrochloric acid. The results from these experiments are tabulated in TABLE I below:

TABLE I

| Nitrile | CuO Conc. | Surface Area M²/g | pH | Yield of Amide |
|---|---|---|---|---|
| Acrylonitrile | 25% | 35 | 4.1 | 5% |
| Acrylonitrile | 25% | 35 | 6.1 | 15% |
| Acrylonitrile | 25% | 33 | 7.5 | 30% |
| Acrylonitrile | 25% | 33 | 8.0 | 60% |
| Acrylonitrile | 25% | 31 | 9.0 | 65% |
| Acrylonitrile | 25% | 34 | 10.5 | 62% |
| Acrylonitrile | 25% | 37 | 11.0 | 45% |
| Acrylonitrile | 25% | 36 | 12.0 | 20% |
| Acrylonitrile | 25% | 36 | 13.0 | 19% |

Similar results were obtained as in the examples above when the concentration of copper oxide in the slurry was varied as well as when the following nitriles were used in the hydrolysis: methacrylonitrile, benzylnitrile, crotononitrile, valeronitrile, and acetonitrile.

EXAMPLE 8

An additional series of experiments were performed exactly as in Example 1 with the exception that the surface area was varied. The results of these experiments are tabulated in TABLE II below:

TABLE II

| Nitrile | CuO Conc | Surface Area M²/g | pH | Yield of Amide |
|---|---|---|---|---|
| Acrylonitrile | 25% | 10 | 10.2 | 25% |
| Acrylonitrile | 25% | 15 | 10.1 | 37% |
| Acrylonitrile | 25% | 300 | 10.1 | 53% |
| Acrylonitrile | 25% | 500 | 10.0 | 48% |
| Acrylonitrile | 25% | 700 | 10.0 | 10% |

We claim:

1. A process for catalytically hydrolyzing a nitrile from the group consisting of acrylonitrile and methacrylonitrile to the corresponding amide by contacting a reactant feed of nitrile in the presence of water with a reduced copper oxide catalyst; the improvement which comprises preparing said reduction copper oxide catalyst by the following steps:
   A. preparing a 5 to 20 percent by weight aqueous slurry of copper oxide, said slurry having a pH within the range 8 to 11; said copper oxide characterized as having a surface area within the range 20 to 500 M²/g;
   B. reducing said slurry of copper oxide of step (A) in a hydrogen atmosphere to prepare a reduced copper oxide catalyst; and then
   C. treating the nitrile with said catalyst prepared in step (B) to form the amide.

2. A process for catalytically hydrolyzing a nitrile from the group consisting of acrylonitrile and methacrylonitrile to the corresponding amide by contacting a reactant feed of nitrile in the presence of water with a reduced copper oxide catalyst; the improvement which comprises preparing said reduced copper oxide catalyst by the following steps:
   A. preparing a 5 to 20 percent by weight aqueous slurry of copper oxide, said slurry having a pH within the range 9 to 10.5 percent said copper oxide characterized as having a surface area within the range 20 to 100 M²/g;
   B. reducing said slurry of copper oxide of step (A) in a hydrogen atmosphere to prepare a reduced copper oxide catalyst; and then
   C. treating the nitrile with said catalyst prepared in step (B) to form the amide.

* * * * *